United States Patent
Lee et al.

(10) Patent No.: US 8,227,106 B2
(45) Date of Patent: Jul. 24, 2012

(54) BATTERY MODULE HAVING COOLING MEANS, AND MIDDLE OR LARGE-SIZED BATTERY PACK CONTAINING THE SAME

(75) Inventors: Jin Kyu Lee, Busan (KR); Hee Soo Yoon, Daejeon (KR); Bumhyun Lee, Seoul (KR); Dal Mo Kang, Daejeon (KR); Minchul Jang, Daejeon (KR); Jongmoon Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/673,467

(22) PCT Filed: Dec. 17, 2009

(86) PCT No.: PCT/KR2009/007570
§ 371 (c)(1),
(2), (4) Date: May 16, 2011

(87) PCT Pub. No.: WO2010/071370
PCT Pub. Date: Jun. 24, 2010

(65) Prior Publication Data
US 2011/0262792 A1 Oct. 27, 2011

(30) Foreign Application Priority Data
Dec. 17, 2008 (KR) .................. 10-2008-0128768

(51) Int. Cl.
*H01M 2/00* (2006.01)
(52) U.S. Cl. ..................... 429/149; 429/152
(58) Field of Classification Search .............. None
See application file for complete search history.

(56) References Cited

U.S. PATENT DOCUMENTS

| 2002/0022179 A1 | 2/2002 | Yuasa et al. | |
|---|---|---|---|
| 2006/0216582 A1* | 9/2006 | Lee et al. | 429/120 |
| 2007/0026303 A1* | 2/2007 | Jeon et al. | 429/143 |
| 2007/0178372 A1* | 8/2007 | Sakakibara | 429/120 |

FOREIGN PATENT DOCUMENTS

| JP | 8-321329 A | 12/1996 |
|---|---|---|
| JP | 2001-319682 A | 11/2001 |
| JP | 2006-172911 A | 6/2006 |
| KR | 10-2008-0032287 A | 4/2008 |

* cited by examiner

*Primary Examiner* — Keith Walker
*Assistant Examiner* — Wyatt McConnell
(74) *Attorney, Agent, or Firm* — Birch, Stewart, Kolasch & Birch, LLP

(57) ABSTRACT

Disclosed herein is a battery module including a plurality of sequentially stacked plate-shaped battery cells and two or more heat dissipation members, wherein the first heat dissipation member extends such that one side of the first heat dissipation member at least partially covers one outermost battery cell (a) of the battery module, and the other side of the first heat dissipation member is interposed between the inside battery cells, and the second heat dissipation member extends such that one side of the second heat dissipation member at least partially covers the outermost battery cell (a) while the second heat dissipation member is not overlapped with the first heat dissipation member, and the other side of the second heat dissipation member is interposed between the inside battery cells.

17 Claims, 3 Drawing Sheets

[Fig. 1]
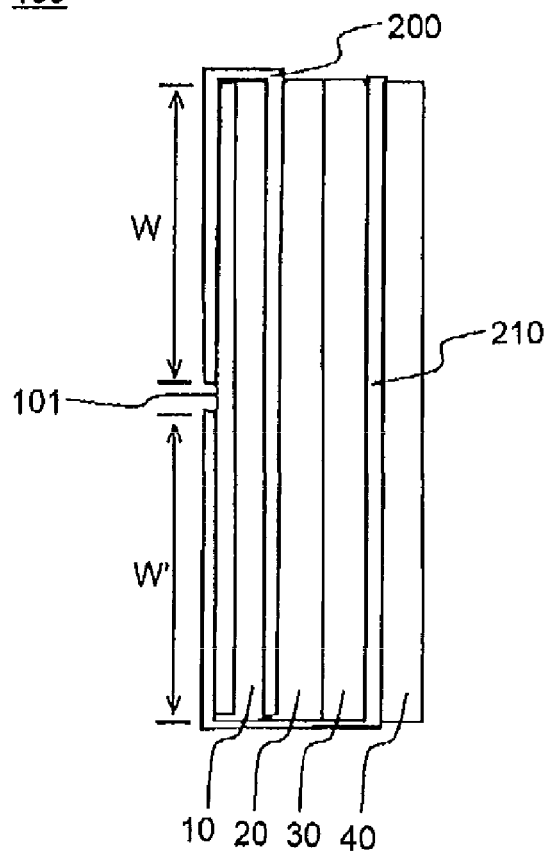
[Fig. 2]
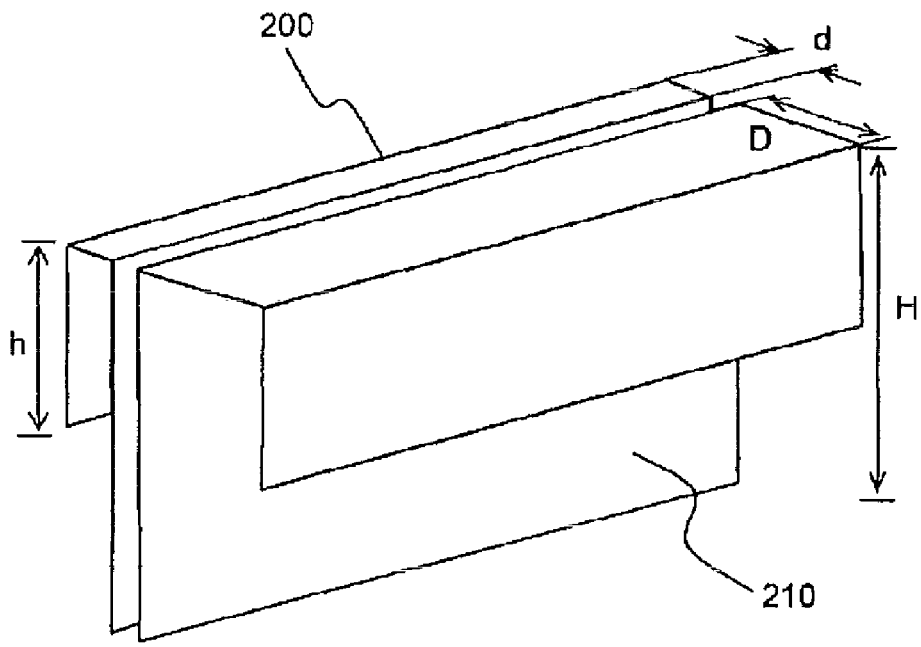

[Fig. 3]
300
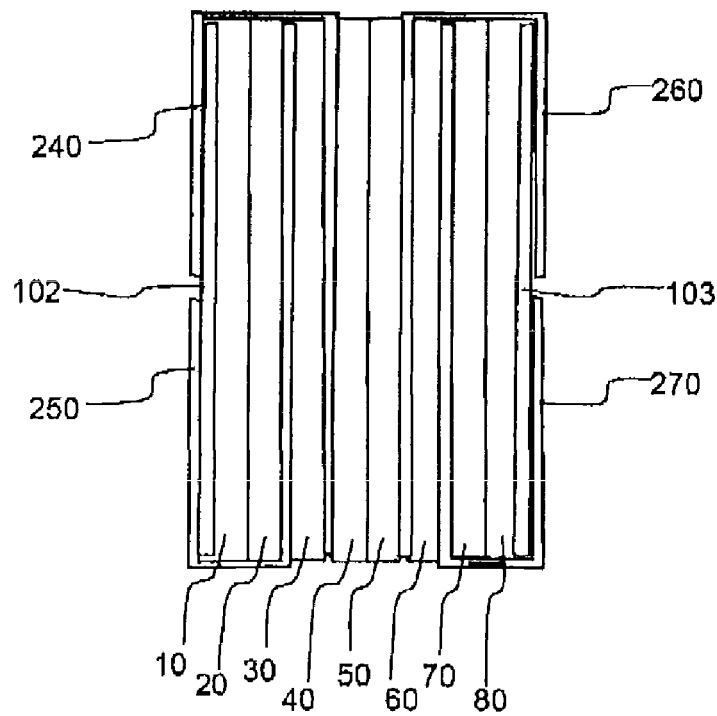
[Fig. 4]
300
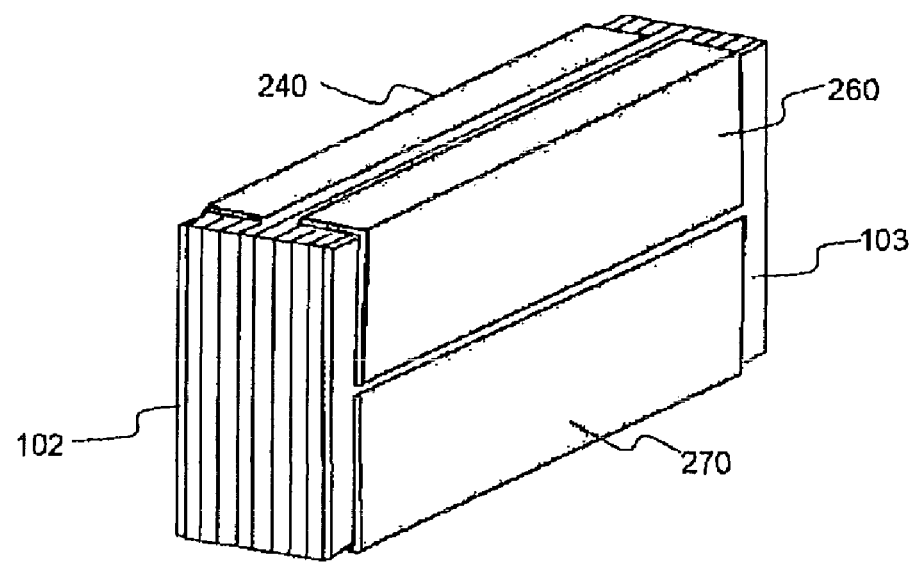

[Fig. 5]
400
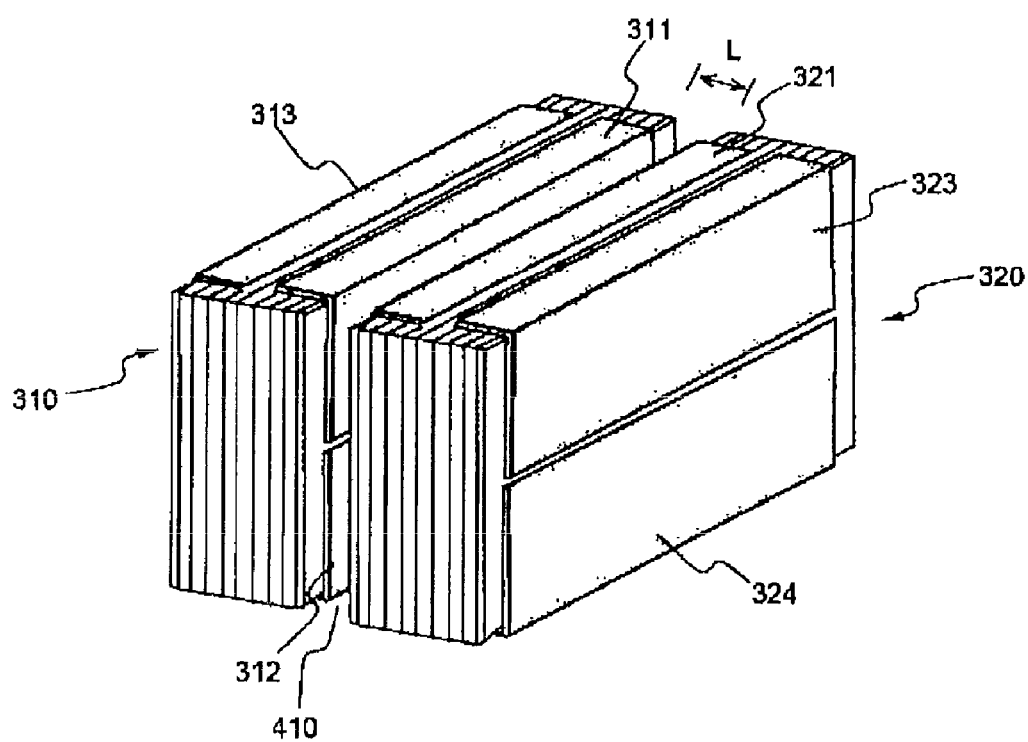

BATTERY MODULE HAVING COOLING MEANS, AND MIDDLE OR LARGE-SIZED BATTERY PACK CONTAINING THE SAME

TECHNICAL FIELD

The present invention relates to a battery module including a plurality of sequentially stacked plate-shaped battery cells and two or more heat dissipation members, and, more particularly, to a battery module constructed to have a structure in which the first heat dissipation member extends such that one side of the first heat dissipation member at least partially covers one outermost battery cell (a) of the battery module, and the other side of the first heat dissipation member is interposed between the inside battery cells, and the second heat dissipation member extends such that one side of the second heat dissipation member at least partially covers the outermost battery cell (a) while the second heat dissipation member is not overlapped with the first heat dissipation member, and the other side of the second heat dissipation member is interposed between the inside battery cells.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle- or large-sized devices, such as vehicles, use a middle- or large-sized battery module having a plurality of battery cells electrically connected to one another because high power and large capacity are necessary for the middle- or large-sized devices.

Preferably, the middle- or large-sized battery module is manufactured so as to have a small size and weight if possible. For this reason, a prismatic battery or a pouch-shaped battery, which can be stacked with high integration and has a small weight to capacity ratio, is usually used as a battery cell (unit cell) of the middle- or large-sized battery module. Especially, considerable interest is currently focused on the pouch-shaped battery, which uses an aluminum laminate sheet as a sheathing member, because the weight of the pouch-shaped battery is small, the manufacturing costs of the pouch-shaped battery are low, and it is easy to modify the shape of the pouch-shaped battery.

Battery cells constituting the middle- or large-sized battery module are secondary batteries which can be charged and discharged. Consequently, a large amount of heat is generated from the high-power, large-capacity secondary batteries during the charge and discharge of the batteries. If the heat, generated from the battery module during the charge and discharge of the battery module, is not effectively removed, the heat accumulates in the battery module, with the result that the deterioration of the battery module is accelerated. According to circumstances, the battery module may catch fire or explode. For this reason, a cooling system is needed in a battery pack for vehicles, which is a high-power, large-capacity battery, to cool battery cells mounted in the battery pack.

Generally, a battery module, which is mounted in the middle- or large-sized battery pack, is manufactured by stacking a plurality of battery cells with high integration. The battery cells are stacked, such that neighboring battery cells are spaced apart from each other by a predetermined distance, to remove heat generated during the charge and discharge of the battery cells. For example, the battery cells may be sequentially stacked such that neighboring battery cells are spaced apart from each other by a predetermined distance without the use of additional members. When the battery cells have low mechanical strength, on the other hand, one or more battery cells may be mounted in a cartridge, and a plurality of cartridges, in each of which the battery cells are mounted, may be stacked to constitute a battery module. Coolant channels may be defined between stacked battery cells or between stacked battery modules to effectively remove heat accumulating between the battery cells or between the battery modules.

In this structure, however, it is necessary to provide a plurality of coolant channels corresponding to the plurality of battery cells, with the result that the overall size of the battery module increases.

Also, the more battery cells are stacked, the narrower the width of each of the coolant channel is, when considering the size of the battery module. As a result, it may be complicated to design a cooling structure. That is, the coolant channels having a width narrower than an inlet port of a coolant cause high pressure loss, with the result that there is great difficulty in designing the shape and position of inlet and outlet ports of the coolant. Also, a fan may be further installed to prevent such pressure loss. As a result, there are design restrictions in, for example, power consumption, fan noise, and space.

Furthermore, battery cells located at the middle of the battery cell stack may not be satisfactorily cooled, and may deteriorate more rapidly than the outermost battery cells. Such nonuniform deterioration of the battery cells may reduce service life of the battery module, which is not preferable in terms of safety.

Consequently, there is a high necessity for a battery module that provides high-power, large-capacity electric power, is manufactured in a simple and compact structure, and has excellent service life and safety characteristics.

DISCLOSURE OF INVENTION

Technical Problem

Therefore, the present invention has been made to solve the above problems, and other technical problems that have yet to be resolved.

It is an object of the present invention to provide a battery module constructed to have a structure in which a plurality of sequentially stacked battery cells are covered by bendable heat dissipation members such that heat transfer is achieved by conduction, thereby uniformly maintaining the overall temperature of the battery module and reducing temperature deviation.

It is another object of the present invention to provide a middle- or large-sized battery pack having a simple structure in which coolant channels are variously adjusted using a plurality of battery modules with the above-stated construction.

Technical Solution

In accordance with one aspect of the present invention, the above and other objects can be accomplished by the provision of a battery module including a plurality of sequentially stacked plate-shaped battery cells and two or more heat dissipation members, wherein the first heat dissipation member extends such that one side of the first heat dissipation member at least partially covers one outermost battery cell (a) of the battery module, and the other side of the first heat dissipation member is interposed between the inside battery cells, and the second heat dissipation member extends such that one side of the second heat dissipation member at least partially covers the outermost battery cell (a) while the second heat dissipation member is not overlapped with the first heat dissipation member, and the other side of the second heat dissipation member is interposed between the inside battery cells.

That is, the battery module according to the present invention is constructed to have a structure in which the two or more heat dissipation members are disposed in contact with at least one surface of each of the plate-shaped battery cells, such that the heat dissipation members are not overlapped with each other, to cover the battery cells, and the two or more heat dissipation members are at least partially exposed outward from the outermost battery cell, thereby effectively discharging heat generated from the battery cells out of the battery module by conduction using the heat dissipation members.

Furthermore, the opposite surfaces of the battery cells may be in tight contact with each other or adjacent to each other together with the heat dissipation members, by which heat transfer is easily achieved, thereby more effectively reducing temperature deviation. Also, it is possible to restrain the increase in size of the battery module including the battery cells and the heat dissipation members and to stack the battery cells with higher integration than battery cells using conventional cooling systems.

In the above, the expression 'the second heat dissipation member is mounted at the battery module while the second heat dissipation member is not overlapped with the first heat dissipation member' means that the heat dissipation members are mounted at the battery module such that the heat dissipation members are not overlapped with each other while satisfying the previously described conditions. Consequently, the first heat dissipation member and the second heat dissipation member are mounted at the battery module such that the first heat dissipation member and the second heat dissipation member are generally opposite to each other.

The heat dissipation members are not particularly restricted as long as the heat dissipation members have the above-described installation structure, and are formed of a thermally conductive material. For example, the heat dissipation members may be formed of a sheet material exhibiting high heat conductivity and bendability.

Such heat dissipation members may be bent based on the shape of the battery cells and the stacking thickness of the battery cells. Consequently, it is possible to flexibly form the installation structure of the heat dissipation members into a desired shape. Also, when the heat dissipation members are formed of a material exhibiting high heat conductivity, it is possible for the heat dissipation members to easily discharge heat generated from the battery cells out of the battery module by conduction, thereby effectively achieving the dissipation of heat from the battery cells.

Typically, the heat dissipation members may be formed of a metal sheet.

In an example, the one side of the first heat dissipation member may cover about ⅓ to about ½ of the outer surface of the outermost battery cell (a), and the one side of the second heat dissipation member may cover about ⅓ to about ½ of the outer surface of the outermost battery cell (a) while the one side of the second heat dissipation member is opposite to the one side of the first heat dissipation member.

Consequently, the one side of the first heat dissipation member and the one side of the second heat dissipation member, which are opposite to each other, cover the entirety or ⅔ of the outer surface of the outermost battery cell. When the outer surface of the outermost battery cell covered by the first heat dissipation member and the second heat dissipation member is less than ⅔ of the entirety of the outer surface of the outermost battery cell, the heat dissipation effect obtained by the installation of the first heat dissipation member and the second heat dissipation member may be little. For this reason, it is preferably for the one side of the first heat dissipation member and the one side of the second heat dissipation member to cover at least ⅔ of the outer surface of the outermost battery cell.

In this aspect, it is more preferable for the one side of the first heat dissipation member to cover about ½ of the outer surface of the outermost battery cell (a) and for the one side of the second heat dissipation member to cover about ½ of the outer surface of the outermost battery cell (a). Alternatively, it may be possible for the one side of the first heat dissipation member to cover about ⅔ of the outer surface of the outermost battery cell (a) and for the one side of the second heat dissipation member to cover about ⅓ of the outer surface of the outermost battery cell (a).

Meanwhile, the other sides of the first and second heat dissipation members, interposed between the battery cells, extend over the entirety of interfaces between the corresponding battery cells. That is, the other sides of the first and second heat dissipation members cover the entirety of interfaces between the stacked battery cells, thereby effectively removing heat generated from the battery cells by conduction.

In an example, the heat dissipation members may be mounted at the battery module such that the other side of each of the heat dissipation members is located at only one surface of the corresponding plate-shaped battery cell. Although each of the heat dissipation members is located at only one surface of the corresponding plate-shaped battery cell, it is possible to achieve desired heat transfer by conduction, thereby easily removing heat generated from the battery cells.

Specifically, on the assumption that the battery cells stacked starting with the outermost battery cell (a) are defined as a first battery cell, a second battery cell, a third battery cell . . . a $p^{th}$ battery cell, the other side of the first heat dissipation member may be located between the first battery cell and the second battery cell, and the other side of the second heat dissipation member may be located between the third battery cell and the fourth battery cell.

Consequently, although the other sides of the first and second heat dissipation members are not located between the second battery cell and the third battery cell, one surface of the second battery cell is disposed in contact with the first heat dissipation member interposed between the first battery cell and the second battery cell, and one surface of the third battery cell is disposed in contact with the second heat dissipation member interposed between the third battery cell and the fourth battery cell, thereby achieving heat dissipation.

According to circumstances, the other side of the second heat dissipation member may be located between the second battery cell and the third battery cell considering that a relatively large amount of heat is generated from the battery cells located at the middle of the battery module. In this case, one surface of the second battery cell is in contact with the first heat dissipation member, and the other surface of the second battery cell is in contact with the second heat dissipation member. Consequently, high heat dissipation effect may be achieved by the two heat dissipation members.

In an example, the battery module may further include a third heat dissipation member and a fourth heat dissipation member mounted at the other outermost battery cell (b) of the battery module. The third heat dissipation member may extend such that one side of the third heat dissipation member at least partially covers the outermost battery cell (b) of the battery module, and the other side of the third heat dissipation member is interposed between the inside battery cells, and the fourth heat dissipation member may extend such that one side of the fourth heat dissipation member at least partially covers the outermost battery cell (b) while the fourth heat dissipation member is not overlapped with the third heat dissipation member, and the other side of the fourth heat dissipation member is interposed between the inside battery cells.

In the above, the outermost battery cell (b) means a battery cell opposite to the outermost battery cell (a) of the battery module constructed to have a structure in which the plurality of battery cells are stacked. That is, the outermost battery cell (a) and the outermost battery cell (b) are located at opposite sides of the battery module. Consequently, the third and fourth heat dissipation members may be mounted at the outermost battery cell (b) like that the first and second heat dissipation members are mounted at the outermost battery cell (a).

In the above-described structure, the third heat dissipation member and the fourth heat dissipation member may be mounted at the battery module such that the third heat dissipation member and the fourth heat dissipation member are not overlapped with the first heat dissipation member and the second heat dissipation member, respectively.

On the assumption that the battery cells stacked starting with the outermost battery cell (b) are defined as an $n^{th}$ battery cell, an $n-1^{th}$ battery cell, an $n-2^{th}$ battery cell ... a $p^{th}$ battery cell, for example, the other side of the third heat dissipation member may be located between the $n^{th}$ battery cell and the $n-1^{th}$ battery cell, and the other side of the fourth heat dissipation member may be located between the $n-2^{th}$ battery cell and the $n-3^{th}$ battery cell.

Consequently, it is possible to manufacture a high-power, large-capacity battery module having no coolant channels by stacking a desired number of battery cells such that the battery cells are covered by a plurality of heat dissipation members while the heat dissipation members are not overlapped with one another.

Meanwhile, the heat dissipation members may be mounted at the battery module while the heat dissipation members are bent to cover sides of the battery cells. For example, the heat dissipation members may be bent in the shape of 'ㄷ'.

According to circumstances, an insulative member may be mounted between the outer surface of the outermost battery cell (a) and the heat dissipation members for preventing the outermost battery cell (a) from being overcooled. Of course, an insulative member may be mounted between the outer surface of the outermost battery cell (b) and the heat dissipation members. The outermost battery cell (a) and the outermost battery cell (b) are battery cells directly exposed to an external environment via the heat dissipation members. Consequently, the outermost battery cell (a) and the outermost battery cell (b) have a higher cooling rate than the battery cells between the outermost battery cell (a) and the outermost battery cell (b). The amount of heat dissipated from each of the outermost battery cells is reduced by the corresponding insulative member, thereby reducing temperature deviation between the battery cells.

The battery module is not particularly restricted as long as the battery module is constructed to have a structure in which a plurality of battery cells are stacked, and the heat dissipation members are interposed between the corresponding battery cells. For example, the battery module may include six to twelve battery cells. Although the plurality of battery cells are stacked, coolant channels may be constructed to extend along the heat dissipation members, and therefore, it is possible to considerably reduce the number of the coolant channels. For example, coolant channels may be provided to extend only along the heat dissipation members on the outermost battery cells. Alternatively, coolant channels may be provided to extend along the heat dissipation members on the outermost battery cells and the heat dissipation members at the tops and/or the bottoms of the battery cells. Consequently, the battery module according to the present invention has a thermally stable structure with a relatively small number of coolant channels as compared with conventional battery modules.

In accordance with one aspect of the present invention, there is provided a middle- or large-sized battery pack including two or more battery modules.

The battery modules may be spaced apart from each other by a predetermined gap serving as a coolant channel for allowing a coolant to flow therethrough. Even in this structure, it may be possible to considerably reduce the number of coolant channels as compared with middle- or large-sized battery packs using conventional cooling systems.

The size of the coolant channel may be appropriately decided based on the amount of heat generated from the battery modules. The gap defined between the battery modules to provide the coolant channel may be 10 to 30% of the thickness of each of the battery modules. If the gap defined between the battery modules is too small as compared with the thickness of each of the battery modules, the coolant channel is much narrower than a coolant inlet port, thereby increasing pressure, with the result that it may be difficult to provide a satisfactory cooling effect. On the other hand, if the gap defined between the battery modules is too large, the overall size of the middle- or large-sized battery pack is excessively increased, which is not preferable. As long as the above-mentioned problems are not caused, therefore, it is a matter of course that the width of the gap may be outside the above-specified range.

The coolant is not particularly restricted as long as the coolant dissipates heat from the battery cells by conduction while flowing along the coolant channel without difficulty. For example, the coolant may be air or water. Preferably, the coolant is air.

The battery pack according to the present invention includes a plurality of battery cells to achieve high power and large capacity. Consequently, the battery pack is preferably used as a power source for electric vehicles, hybrid electric vehicles, or plug-in hybrid electric vehicles, in which high-temperature heat generated during the charge and discharge of the battery cells is a serious safety concern.

BRIEF DESCRIPTION OF DRAWINGS

The above and other objects, features and other advantages of the present invention will be more clearly understood from the following detailed description taken in conjunction with the accompanying drawings, in which:

FIG. 1 is a partial front view illustrating a battery module according to an embodiment of the present invention;

FIG. 2 is a perspective view illustrating heat dissipation members of FIG. 1;

FIG. 3 is a front view illustrating a battery module according to another embodiment of the present invention;

FIG. 4 is a perspective view of the battery module according to the another embodiment of the present invention; and FIG. 5 is a perspective view illustrating a middle- or large-sized battery pack including two battery modules, one of which is shown in FIGS. 3 and 4.

MODE FOR THE INVENTION

Now, exemplary embodiments of the present invention will be described in detail with reference to the accompanying drawings. It should be noted, however, that the scope of the present invention is not limited by the illustrated embodiments.

FIG. 1 is a partial front view typically illustrating a battery module according to an embodiment of the present invention. For convenience of description, battery cells are schematically shown while other members, such as electrode terminals and connection members, to constitute the battery module are omitted.

Referring to FIG. 1, the battery module 100 is constructed to have a structure in which four plate-shaped battery cells 10, 20, 30, and 40 are stacked while being adjacent to one another, and two heat dissipation members 200 and 210 are mounted at predetermined positions.

The first heat dissipation member 200 has one side to cover about one half W of the outer surface of the first battery cell 10. The second heat dissipation member 210 has one side to cover about the other half W' of the outer surface of the first battery cell 10. The one side of the second heat dissipation member 210 is opposite to the one side of the first heat dissipation member 200. Consequently, the entirety of the outer surface of the first battery cell 10, which one of the outermost battery cells, is covered by the first heat dissipation member 200 and the second heat dissipation member 210.

The first heat dissipation member 200 is bent such that the other side of the first heat dissipation member 200 is located between the first battery cell 10 and the second battery cell 20. The second heat dissipation member 210 is bent such that the other side of the second heat dissipation member 210 is located between the third battery cell 30 and the fourth battery cell 40. The other side of the second heat dissipation member 210 extends over the entirety of the interface between the third battery cell 30 and the fourth battery cell 40.

Consequently, the first heat dissipation member 200 and the second heat dissipation member 210 are mounted at the battery module 100 such that the first heat dissipation member 200 and the second heat dissipation member 210 are not overlapped with each other.

Also, an insulative member 101 is mounted between the outer surface of the first battery cell 10 and the first and second heat dissipation members 200 and 210 for preventing the first battery cell 10 from being overcooled.

FIG. 2 is a perspective view typically illustrating the heat dissipation members of FIG. 1. For easier comparison, the heat dissipation members are shown in a state in which the heat dissipation members do not have the arrangement structure mounted at the battery module of FIG. 1 but have the same orientation.

Referring to FIG. 2, the heat dissipation members 200 and 210 are formed of a metal sheet exhibiting high heat conductivity and bendability. The heat dissipation members 200 and 210 are bent in the shape of 'ᄃ' to cover sides of corresponding battery cells (not shown).

Specifically, one side of each of the heat dissipation members 200 and 210 has a relatively small length h to partially cover the outer surface of the outermost battery cell (not shown). The other side of each of the heat dissipation members 200 and 210 has a relatively large length H to be disposed at the entirety of the interface between the battery cells.

Meanwhile, the second heat dissipation member 210 has a bent width D greater than a bent width d of the first heat dissipation member 200. This is because the other side of the first heat dissipation member 200 is interposed between the first battery cell 10 and the second battery cell 20, as shown in FIG. 1, and therefore, the bent width d of the first heat dissipation member 200 corresponds to the thickness sum of the insulative member 101 and the first battery cell 10, whereas the other side of the second heat dissipation member 210 is interposed between the third battery cell 30 and the fourth battery cell 40, as shown in FIG. 1, and therefore, the bent width D of the second heat dissipation member 210 corresponds to the thickness sum of the insulative member 101, the first battery cell 10, the second battery cell 20, and the third battery cell 30.

FIG. 3 is a front view illustrating a battery module according to another embodiment of the present invention, and FIG. 4 is a perspective view of the battery module according to the another embodiment of the present invention.

Referring to these drawings, the battery module 300 is constructed to have a structure in which eight plate-shaped battery cells are stacked while being in tight contact with each other without air gaps, and four heat dissipation members are mounted at predetermined positions.

The first heat dissipation member 240 covers about one half, and the second heat dissipation member 250 covers about the other half, of the outer surface of the first battery cell 10, which one of the outermost battery cells, at one side of each of the first and second heat dissipation members 240 and 250. The third heat dissipation member 260 covers about one half, and the fourth heat dissipation member 270 covers about the other half, of the outer surface of the eight battery cell 80, which the other outermost battery cell, at one side of each of the third and fourth heat dissipation members 260 and 270.

The first heat dissipation member 240 is bent such that the other side of the first heat dissipation member 240 is interposed between the third battery cell 30 and the fourth battery cell 40, and the second heat dissipation member 250 is bent such that the other side of the second heat dissipation member 250 is interposed between the second battery cell 20 and the third battery cell 30. Also, the third heat dissipation member 260 is bent such that the other side of the third heat dissipation member 260 is interposed between the fifth battery cell 50 and the sixth battery cell 60, and the fourth heat dissipation member 270 is bent such that the other side of the fourth heat dissipation member 270 is interposed between the sixth battery cell 60 and the seventh battery cell 70.

The battery cells 10, 20, 40, 50, 70 and 80 are in direct or indirect contact with the corresponding heat dissipation members 240, 250, 260, and 270 at one surface of each of the battery cells 10, 20, 40, 50, 70 and 80. The battery cells 30 and 60 are in direct contact with the corresponding heat dissipation members 240, 250, 260, and 270 at opposite surfaces of each of the battery cells 30 and 60. However, other different arrangements are also possible. According to circumstances, middle battery cells, which may be subject to serious heat accumulation, may be in contact with the corresponding heat dissipation members at opposite surfaces of each of the middle battery cells.

Also, insulative members 102 and 103 are mounted between the first battery cell 10 and the first heat dissipation member 240 and between the eighth battery cell 80 and the fourth heat dissipation member 270, respectively, for preventing the battery cells from being overcooled.

Consequently, it is possible to uniformly dissipate heat from the battery cells, thereby reducing overall temperature deviation.

FIG. 5 is a perspective view typically illustrating a middle- or large-sized battery pack including two battery modules, one of which is shown in FIGS. 3 and 4.

Referring to FIG. 5, the middle- or large-sized battery pack 400 includes two battery modules 310 and 320. The battery modules 310 and 320 are spaced apart from each other by a gap L equivalent to about 20% of the thickness of each of the battery modules. The gap serves as a coolant channel for air flow.

Coolant channels may also be provided at a region corresponding to the left-side outer surface of the battery module 310 and a region corresponding to the right-side outer surface of the battery module 320. According to circumstances, coolant channels may also be provided at regions corresponding to the tops and/or bottoms of the battery modules 310 and 320.

In the above-described structure, heat generated from battery cells of the battery modules is conducted to heat dissipation members 311, 312, 313, 321, 323, and 324. The conducted heat is dissipated when a coolant passing through the coolant channel contacts the heat dissipation members 311, 312, 313, 321, 323, and 324. Consequently, effective heat dissipation may be achieved although no coolant channels are provided between the respective battery cells.

Industrial Applicability

As is apparent from the above description, the battery module according to the present invention is constructed to have a structure in which a plurality of sequentially stacked battery cells are covered by heat dissipation members in specific forms such that heat transfer is achieved by conduction. Consequently, it is possible to uniformly maintain the overall temperature of the battery module, although the battery module is constructed to have a compact structure, thereby considerably improving the service life and reliability of the battery module.

Also, it is possible to variously adjust gaps between a plurality of battery modules with the above-stated construction, thereby easily constructing a cooling system for middle- or large-sized battery packs.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module comprising:
    a plurality of sequentially stacked plate-shaped battery cells;
    a first heat dissipation member having a first side at least partially covering a first outermost battery cell of the battery module, and a second side of the first heat dissipation member interposed between two battery cells; and
    a second heat dissipation member having a first side at least partially covering the first outermost battery cell;
    wherein the first side of the second heat dissipation member does not overlap the first side of the second heat dissipation member,
    wherein the second side of the second heat dissipation member is interposed between two battery cells, and
    wherein the first side of the first heat dissipation member is not connected to the first side of the second heat dissipation member.

2. The battery module according to claim 1, wherein the heat dissipation members are each formed of a sheet material exhibiting heat conductivity and bendability.

3. The battery module according to claim 2, wherein the heat dissipation members are each formed of a metal sheet.

4. The battery module according to claim 1, wherein the first side of the first heat dissipation member covers about ⅓ to about ½ of an outer surface of the first outermost battery cell, and the first side of the second heat dissipation member covers about ⅓ to about ½ of the outer surface of the first outermost battery cell; and
    wherein the first side of the second heat dissipation member is opposite to the first side of the first heat dissipation member.

5. The battery module according to claim 1, wherein the second sides of the first and second heat dissipation members extend over the entirety of interfaces between battery cells.

6. The battery module according to claim 1, wherein the heat dissipation members are mounted at the battery module such that the second side of each of the heat dissipation members is located at only one surface of the corresponding plate-shaped battery cell.

7. The battery module according to claim 1,
    wherein the first outermost battery cell is a first battery cell; and
    wherein the second side of the first heat dissipation member is located between the first battery cell and a second battery cell, and the second side of the second heat dissipation member is located between a third battery cell and a fourth battery cell.

8. The battery module according to claim 1, further comprising:
    a third heat dissipation member; and
    a fourth heat dissipation member mounted at a second outermost battery cell,
    wherein the third heat dissipation member has a first side at least partially covering the second outermost battery cell, and a second side of the third heat dissipation member is interposed between two battery cells,
    wherein the fourth heat dissipation member has a first side at least partially covering the second outermost battery cell,
    wherein the first side of the fourth heat dissipation member does not overlap first side of the third heat dissipation member, and
    wherein the second side of the fourth heat dissipation member is interposed between two battery cells.

9. The battery module according to claim 8, wherein the third heat dissipation member and the fourth heat dissipation member are mounted at the battery module such that the third heat dissipation member and the fourth heat dissipation member are not overlapped with the first heat dissipation member and the second heat dissipation member, respectively.

10. The battery module according to claim 8, wherein the second outermost battery cell is an nth battery cell, and
    Wherein the second side of the third heat dissipation member is located between the nth battery cell and an $n^{th}-1$ battery cell, and the second side of the fourth heat dissipation member is located between an $n^{th}-2$ battery cell and an $n^{th}-3$ battery cell.

11. The battery module according to claim 1, wherein the heat dissipation members are mounted at the battery module to cover sides of the battery cells.

12. The battery module according to claim 1, further comprising an insulative member mounted between an outer surface of the first outermost battery cell and the heat dissipation members for preventing the first outermost battery cell from being overcooled.

13. The battery module according to claim 1, wherein the battery module comprises six to twelve battery cells.

14. A battery pack comprising two or more battery modules according to claim 1.

15. The battery pack according to claim 14, wherein the battery modules are spaced apart from each other by a predetermined gap serving as a coolant channel for allowing a coolant to flow therethrough.

16. The battery pack according to claim 15, wherein the coolant comprises air.

17. The battery pack according to claim 14, wherein the battery pack is used as a power source for electric vehicles, hybrid electric vehicles, or plug-in hybrid electric vehicles.

* * * * *